Figure 1:
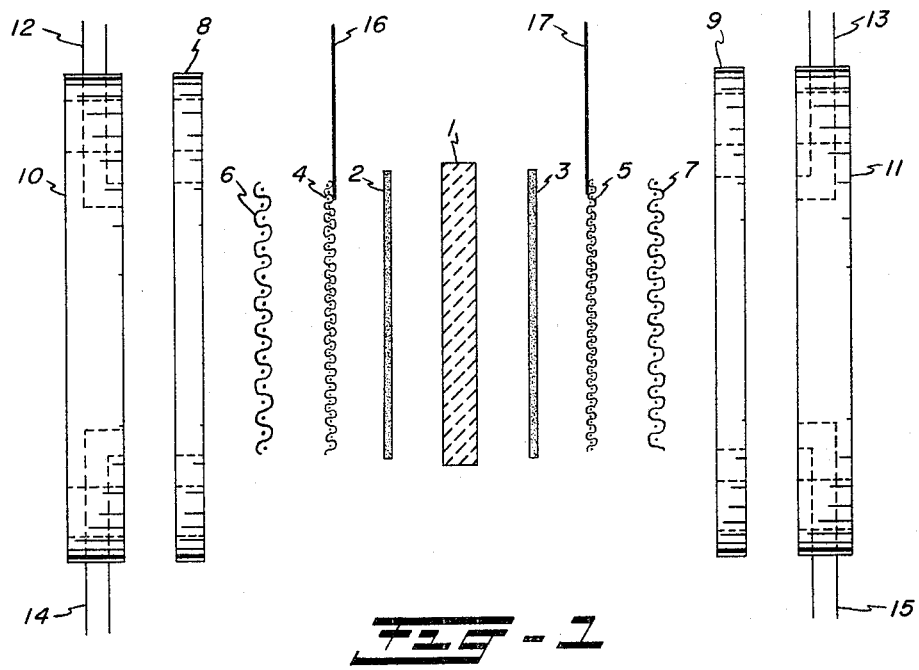

INVENTORS
Stanley H. Langer
Henry P. Landi
BY
ATTORNEY

United States Patent Office 3,282,738
Patented Nov. 1, 1966

3,282,738
PROCESS FOR PREPARING MOLDED
ELECTRODES
Stanley Harold Langer, Stamford, Conn., and Henry Patrick Landi, Yorktown Heights, N.Y., assignors to American Cyanamid Company, Stamford, Conn., a corporation of Maine
Filed Feb. 28, 1963, Ser. No. 261,770
6 Claims. (Cl. 136—120)

The present invention relates to a novel process for preparing catalytic electrodes suitable for use in fuel cells and especially suitable for use in hydrogen-oxygen containing gas fuel cells. More particularly, the invention relates to the preparation of molded catalytic electrodes employing (a) various organic or inorganic catalytic agents, and (b) a well-defined class of binders or water-proofing agents whereby the molded electrode is formed at relatively low temperatures. Still more particularly, this invention is concerned with the preparation of molded catalytic electrodes employing polyethylene latex emulsion as the binder and water-proofing agent in admixture with catalytic materials.

In the past, electrodes suitable for use in fuel cells have been molded from either platinum black or any suitable noble metal on a metal screen supported on carbon. Unfortunately, such electrodes cannot be universally employed because of failure due to the flooding of the electrode. To obviate this effect, binders or water-proofing agents, such as petroleum waxes or polytetrafluoroethylene, have been added prior to molding on the platinum black or noble metal supported on carbon. Where polytetrafluoroethylene is employed, a molding temperature of at least about 300° C. is normally required. Such elevated temperatures do not permit the wide use of additives, such as quinone-formaldehyde condensates and organometallic compounds exemplified by chromium acetylacetonate, which cannot withstand temperatures of 300° C., or above, without decomposition. Where petroleum waxes have been used as the water-proofing agent, such additives demonstrate a tendency to completely cover the active catalytic sites in the electrode and thus prevent the electrode from functioning properly. It has also been customary to spray a catalytic electrode with a water-proofing agent such as, for instance, a solution of petroleum waxes. Unfortunately, this procedure is ineffectual, for the reason that the entire electrode is coated with a uniform film of the water-proofing agent, thus preventing the electrode from functioning properly. This is due again to the inactivation or covering of the reactive sites in the electrode. Thus, there exists a need for a method of preparing molded electrodes which are substantially free from flooding but contain a sufficient number of reactive sites to permit an electrode to function at desirable high levels. Further, there exists a need for a method of preparing molded electrodes which permits the introduction of suitable additives that would normally decompose at elevated temperatures.

It is, therefore, a principal objective of the present invention to provide a catalytic electrode which obviates the difficulties of the prior art. It is a further object to provide an electrode having a high level of activity and is capable of being prepared in a simple, strightforward and economical manner. It is a still further object to provide a process for preparing an electrode which contains a water-proofing agent which can be effectively utilized at a molding temperature of less than about 135° C. These and other objects will become apparent from a consideration of the following detailed description.

It has been surprisingly found that a method for molding an electrode of good strength and uniform catalyst distribution can be provided in a straightforward manner, utilizing a novel water-proofing or binding agent whereby an electrode can be molded at a temperature of less than about 135° C. In brief, this is accomplished by incorporating a polyethylene latex emulsion into a solids blend containing a conductive filler and catalyst, and thereafter molding the mixture at a temperature of less than 135° C. and at pressures of not more than about 350 pounds per square inch.

According to the process of the present invention, the electrode is formed by combining an electrically conductive filler, a catalyst and a water-repellent composition comprising a polyethylene latex emulsion. The order of combining is not critical and any order of addition is within the purview of the invention. However, thorough mixing or blending of the components of the mixture, as by stirring, is a good practice.

Illustrative of the electrical conductive filler herein employed is lamp black or graphitic carbon. One such graphitic carbon is obtained as a by-product in the manufacture of calcium cyanamide from the reaction of calcium carbide and nitrogen at temperatures in excess of 1000° C. Other carbons derived from substantially any source can be employed. In general, carbons resulting from reactions in which they are produced in a high temperature liquid state process by nucleation are preferred. Usually, from about 40% to about 80%, and preferably from 50% to about 60% of the conductive filler, based on the weight of the electrode solids blend, can be employed.

The catalyst, equal to from about 1% to 95%, based on the weight of the electrode solids, is usually a metal such as platinum, palladium, ruthenium, titanium or zirconium. The metal can be deposited on the carbon by reducing the metal in the form of its acid, such as for instance, the sodium borohydride reduction of chloroplatinic acid to platinum. The metal, further, can be added in a finely divided state but is inert in the particular medium. If desired, however, an organic material which would normally decompose at temperatures above 300° C., such as quinone-formaldehyde condensate, or an organo-metallic compound, such as chromium acetylacetonate, can be employed either as a co-catalyst or as the catalyst in lieu of the metal.

It is highly advantageous to employ a water-repellent composition in admixture with the aforementioned electrically conductive filler and catalytic material. Such combination reduces the possibility of flooding during cell operation. If a water-repellent composition is omitted, the performance of the electrode is markedly reduced in a comparatively short period of time. Illustrative water-repellent compositions contemplated are polyethylene latex emulsions wherein the polyethylene exists as finely divided particles. These particles remain as such in the electrode subsequent to molding to provide overall water-repellency, while permitting access of reactive gases to the reactive catalytic sites during use. Stated otherwise, the utilization of a polyethylene latex emulsion results in a discontinuous film which is highly efficient in preventing harmful flooding. In general, from about 1% to about 40% by weight of the polyethylene particles, based on the weight of the overall electrode solids, can be added to the mixture prior to molding.

The polyethylene emulsion as such is formed by dispersing discrete particles of polyethylene, usually from about 1 to about 5 microns in diameter, in distilled water containing either a non-ionic or anionic emulsifying agent such as, for instance, ethoxylated octylphenol, ethoxylated nonylphenol, or an alkali metal salt of an alkyl aryl sulfonic acid. Advantageously, any commercially available non-ionic or anionic emulsifying reagent of the class defined can be employed. The amount of discrete particles so dispersed usually ranges from about 5% to about 15% of the overall emulsion composition.

The mixture containing the carbon filler, catalyst and polyethylene latex emulsion is thoroughly blended or admixed. The mixture is next placed on a metal cloth backing and squeezed dry, whereby substantial amounts of water are removed. Although the metal cloth backing can be omitted, such is not a preferred practice because a structurally weaker electrode results.

The preformed sheet is next molded by pressing the sheet in a mold at a temperature less than 135° C., and usually from about 70° C. to 95° C., under superatmospheric pressure usually between about 200 and 1000 p.s.i., or higher for a period of from about five to thirty minutes. The electrode is next washed as for instance with either aqueous mineral acids including hydrochloric or sulfuric acid, or with aliphatic alcohols such as methanol, ethyl alcohol or isopropanol or equivalents thereof, to remove any occluded emulsifier which normally would impair the catalytic action of the electrode. The electrode is now ready for use in a fuel cell.

In order to clarify the invention utilizing the above-formed electrode, the accompanying drawing defines one embodiment of such utilization.

Figure 2:
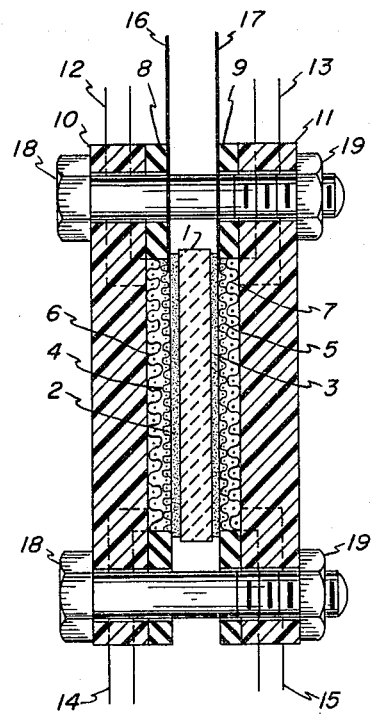

FIG. 1 of the drawing is an exploded plan view partially in section of a fuel cell employing the molded, water-proofed electrode of the present invention, and FIG. 2 is a partially expanded side view, partially in section of the fuel cell of FIG. 1.

In FIG. 1, a membrane 1, comprising filter paper saturated in electrolyte, usually 2 N to 8 N sulfuric acid, is positioned between electrodes 2 and 3 of the present invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17 connected onto current collector screens 4 and 5 are the conductive members through which current flows from and to the fuel cell via the external circuit when the cell is in operation. The cell is secured by means of bolts 18 and nuts 19 as shown in FIG. 2.

The invention will be illustrated in conjunction with the following examples which are to be taken as illustrative only and not by way of limitation. All parts are by weight unless otherwise stated.

Example 1

An electrode sheet is molded on a 4″ x 4″ stainless steel screen employing a polyethylene binder with the following composition: 91 parts of platinum black and 9 parts of 1 to 5 micron polyethylene particles added as a 10% polyethylene aqueous emulsion containing nonylphenolethylene oxide emulsifier. Total weight of the electrode solids is 2.75 grams per 4″ x 4″ area.

Stainless steel wire cloth is employed as a carrier and support. It is held flat on a sheet of ¼″ plate glass secured with masking tape. The catalytic material in the form of a paste or slurry is spread uniformly over the cloth. Subsequently, the cloth is transferred to blotter paper for initial drying. From material which passes through the cloth onto the glass plate is employed the final surfacing of the electrode sheet. The sheet is then placed on a fresh blotter and allowed to dry in a desiccator. Finally, the sheet is pressed for 10 minutes at 85° C. at a pressure of 300 p.s.i. An electrode is next cut from the sheet and tested as a hydrogen and oxygen electrode against standard platinum black electrodes in an experimental fuel cell containing a membrane comprising filter paper saturated in 2 N sulfuric acid.

At a current density of 74 milliamperes per square centimeter, the voltage recorded is 0.7 volt as a hydrogen electrode and 36 milliamperes per square centimeter as an oxygen electrode.

Example 2

This example illustrates the enhanced, improved performance of an electrode after removal of emulsifier therefrom.

The procedure of Example 1 is repeated in every detail, except that the electrode is immersed in methanol for one hour after it is formed and washed with distilled water for purposes of removing the residual emulsifier in the electrode. A current density of 76 milliamperes per square centimeter is recorded at 0.7 volt as an oxygen electrode.

Example 3

An electrode sheet is molded on a 2″ x 4″ stainless steel screen with the following formulation: 87 parts of platinum black and 13 parts of polyethylene particles added as a 10% polyethylene aqueous emulsion. The total weight of electrode solids employed on a 2″ x 4″ area is 1.49 grams.

As in Example 1 above, the sheet is pressed for 10 minutes at 95° C. and 300 p.s.i. The electrode recovered is cut from the sheet and is tested in a fuel cell containing a membrane comprising filter paper saturated with 2 N sulfuric acid.

At a current density of 84 milliamperes per square centimeter, the voltage recorded is 0.7 volt as a hydrogen electrode.

Example 4

This example illustrates the effect in utilizing a polyethylene solution which is sprayed onto an electrode.

The procedure of Example 1 above is repeated in every detail, except that an electrode is formed absent polyethylene particles. The electrode is sprayed on both sides with an atomizer. This is accomplished by employing a 1.6% solution of polyethylene dissolved in carbon tetrachloride. In order to maintain the polyethylene in solution, it is necessary to maintain the contents in the atomizer at about 70° C. The sprayed electrode is quite smooth and white in color indicating that the polyethylene tends to concentrate at the surface. Subsequent analysis indicates that the polyethylene approximates 10% by weight of the electrode solids.

The above sprayed electrode is next inserted into a fuel cell containing a membrane filter paper saturated in 2 N sulfuric acid. The voltage recorded is 0.7 volt at a current density of only 37 milliamperes per square centimeter as a hydrogen electrode.

Example 5

An electrode sheet is molded on a 2″ x 4″ strip of stainless steel screen employing the following composition: 86 parts of a graphite, 5 parts of platinum black and 9 parts of polyethylene added as a 10% solids polyethylene aqueous emulsion containing an aryl alkyl sulfonic acid emulsifier. The graphite, platinum black and additive are intimately mixed for a period of about 5 minutes. After initial removal of water as by blotting on blotter paper, the sheet is molded for about 10 minutes at 95° C. and 300 p.s.i. The electrode is next tested as in Example 4 above. At a current density of 44 milliamperes per square centimeter, the voltage recorded is 0.7 volt as a hydrogen electrode.

In Examples 6 and 7 there is illustrated the usefulness of polyethylene electrodes where an organo-metallic catalyst is incorporated as a co-catalyst. These electrodes are prepared in accordance with the procedure of Example 1.

*Example 6*

A supported electrode sheet is molded on a 2″ x 4″ stainless steel screen having the following composition: 84.6 parts of a 5% platinum (chemically deposited) on graphite, and 15.4 parts of polyethylene from a polyethylene latex containing 10% by weight of solids. Total electrode solids weight is 1.3 grams per 2″ x 4″ of surface. After forming the sheet and drying, it is compressed for 10 minutes at 95° C. and 300 p.s.i. Only one catalyst is present.

An electrode cut from the above sheet is tested as a hydrogen and oxygen electrode against standard electrodes. A current density of 7.0 milliamperes per square centimeter at 0.7 volt is recorded for performance as a hydrogen electrode and less than 1.0 milliampere per square centimeter as an oxygen electrode.

*Example 7*

A supported electrode sheet is prepared as in Example 6 on a 2″ x 4″ stainless steel screen employing the following composition: 84.6 parts of a 5% platinum (chemically deposited) on graphite onto which is further deposited 2% chromium acetylacetonate from a 1% solution in benzene, and 15.4 parts of polyethylene from a polyethylene latex containing 10% by weight of solids. Total weight of electrode solids is 1.3 grams per 2″ x 4″ of surface.

An electrode cut from this sheet is tested as a hydrogen and oxygen electrode against standard counter electrodes. A current density of 59.2 milliamperes per square centimeter at 0.7 volt is recorded for performance as a hydrogen electrode and less than 1.0 milliampere per square centimeter as an oxygen electrode.

*Example 8*

An unsupported electrode sheet (2″ x 4″) is prepared with the following composition: 66.5 parts of graphite, 22.4 parts of platinum black, 1.9 parts of colloidal silica, and 9.2 parts of polyethylene particles added as a polyethylene latex containing 40% by weight of solids. Total weight of electrode solids is 1.43 grams per 2″ x 4″ surface. Addition of 1.5 parts by volume of distilled water is required to form a paste. After forming a sheet by spreading the paste on polyfluoroethylene film and drying at 110° C., it is compressed 10 minutes at 95° C. and 300 p.s.i.

An electrode cut from the above sheet is tested as a hydrogen and oxygen electrode against standard counter electrodes. A current density of 45.2 milliamperes per square centimeter at 0.7 volt is recorded for performance as a hydrogen electrode and 36.2 milliamperes per square centimeter at 0.7 volt as an oxygen electrode.

*Example 9*

An unsupported electrode sheet (2″ x 4″) is prepared repeating the procedure of Example 8 above, except that the electrode contains the following composition: 16.2 parts of graphite, 63.8 parts of platinum black, and 20 parts of polyethylene particles added as an aqueous latex containing 40% by weight of solids. Total weight of of electrode solids is 1.3 grams per 2″ x 4″ surface. Addition of 1.0 part by volume of distilled water is required to form a paste.

An electrode cut from the above sheet is tested as a hydrogen and oxygen electrode against standard counter electrodes. A current density of 43.4 milliamperes per square centimeter at 0.7 volt is recorded for performance as a hydrogen electrode and 16.0 milliamperes per square centimeter at 0.7 volt as an oxygen electrode.

We claim:
1. In the preparation of a molded, catalytic fuel cell electrode, whereby a discontinuous film is formed thereon so as to prevent harmful flooding, the improvement which consists essentially in the steps of: admixing (a) an electrically conductive filler in an amount equal to between about 40% and about 80%, (b) an electrochemical catalyst in an amount ranging from about 1% to less than about 95% and (c) a water-repellent composition equal to from about 1% to about 40% introduced as a polyethylene aqueous emulsion containing discrete particles of from about one to about five microns in diameter, said percentages being based on the weight of the electrode solids mixture; and, thereafter, pressure molding the latter mixture under superatmospheric pressure and at a temperature not to exceed about 135° C.
2. The process according to claim 1, wherein the molded electrode is further washed to remove emulsifier therefrom.
3. The process according to claim 1, wherein the conductive filler is graphite.
4. The process according to claim 1, wherein the catalyst is platinum.
5. The process according to claim 1, in which a mixture of catalysts is employed.
6. The process according to claim 1, in which the mixture of catalysts consists of platinum and chromium acetylacetonate.

References Cited by the Examiner

UNITED STATES PATENTS

| | | | |
|---|---|---|---|
| 2,649,492 | 8/1953 | Linton et al. | 264—103 XR |
| 2,824,165 | 2/1958 | Marsal | 136—122 |
| 2,985,599 | 5/1961 | Bradley | 264—105 XR |
| 3,037,266 | 6/1962 | Pfister | 264—105 XR |
| 3,134,697 | 5/1964 | Niedrach | 136—86 |
| 3,171,757 | 3/1965 | Duddy | 136—86 XR |
| 3,181,973 | 5/1965 | Duddy | 136—86 XR |

FOREIGN PATENTS

| | | |
|---|---|---|
| 656,694 | 1/1963 | Canada. |
| 676,122 | 12/1963 | Canada. |
| 1,004,810 | 10/1960 | Germany. |

ROBERT F. WHITE, *Primary Examiner.*

ALEXANDER H. BRODMERKEL, *Examiner.*

J. A. FINLAYSON, *Assistant Examiner.*